(12) United States Patent
Wanner

(10) Patent No.: US 6,584,194 B1
(45) Date of Patent: Jun. 24, 2003

(54) TELEPHONE OR COMMUNICATION TERMINAL WITH IMPROVED CALLING ALERT SIGNAL DETECTION BY USING AN ACTIVITY DETECTOR

(75) Inventor: Jean-Marc Wanner, Vendenheim (FR)

(73) Assignee: Alcatel, Paris (FR)

( * ) Notice: Subject to any disclaimer, the term of this patent is extended or adjusted under 35 U.S.C. 154(b) by 351 days.

(21) Appl. No.: 09/722,324

(22) Filed: Nov. 28, 2000

(30) Foreign Application Priority Data

Nov. 29, 1999 (EP) ............................................. 99440329

(51) Int. Cl.[7] ................................................ H04M 1/00
(52) U.S. Cl. .................... 379/351; 379/386; 379/142.01
(58) Field of Search ........................ 379/142.01, 142.04, 379/142.08, 142.13, 164, 351, 386

(56) References Cited

U.S. PATENT DOCUMENTS 5,638,436 A    6/1997  Hamilton
5,649,002 A  * 7/1997  Brady et al. ........... 379/142.01
5,974,138 A   10/1999  Sambhwani et al.
6,163,598 A  * 12/2000 Moore ..................... 379/93.23

* cited by examiner

*Primary Examiner*—Forester W. Isen
*Assistant Examiner*—Jefferey Harold
(74) *Attorney, Agent, or Firm*—Sughrue Mion, PLLC

(57) ABSTRACT

A communication terminal comprising a receiving path and a sending path linked to the communication line, the receiving path being connected to a system able to detect, during a communication, an alert signal (e.g., a CAS signal) sent by a station (e.g., the local telephone exchange station or central office) upon any new call or connection request for the terminal and able to allow reception by the terminal, e.g., of data related to each new caller, by interrupting temporarily the presently existing communication, the terminal including a detector (7) able to detect any activity or any signal transmission, and/or the absence of the same, in the sending path (3) of the terminal (1) and to deliver a corresponding information signal (IS) to the signal detection system (5), the latter adjusting its detection method or mode or selecting a corresponding detection subsystem accordingly.

8 Claims, 1 Drawing Sheet

TELEPHONE OR COMMUNICATION TERMINAL WITH IMPROVED CALLING ALERT SIGNAL DETECTION BY USING AN ACTIVITY DETECTOR

BACKGROUND OF THE INVENTION

The present invention relates generally to services in relation with communication via telephone networks, more particularly in relation with the service known as Caller ID or Call Waiting (CIDCW, CID type 2), especially on PSTN lines, and concerns a telephone or a similar communication terminal with improved calling alert signal (CAS) detection.

In telephone networks offering a Caller ID or Call Waiting or CIDCW service, the following steps are executed by the local telephone exchange station or central office an the considered telephone or similar communication terminal, upon arrival at said station or office of each new call or connection request from a new caller for said telephone or communication terminal while the latter is already engaged and in communication with a distant telephone or communication terminal of a calling or called user:

- the station or office mutes or cuts off the transmission from the engaged distant user;
- the station or office sends a call signal (SAS, generally at 440 Hz) and then a calling alert signal (CAS, generally a bi-frequency signal at 2130 Hz and 2750 Hz during 80 ms);
- the considered telephone or communication terminal detects the CAS signal, mutes its sending path and send an acknowledgement signal (for example DTMF "D") back to the station or office;
- upon reception of the acknowledgement signal, the station or office transmits identification data (name, phone number, . . . ) concerning the new caller which is stored and/or displayed by the considered telephone or communication terminal after setting its modem (for example V23 or Bell 202) into receiving mode;
- and finally the station or office suspends the cut off of transmission from the engaged distant user, the considered telephone or communication terminal demutes its sending path and the existing audio path is restored and the communication can be continued normally as before interruption.

The main difficulty encountered while providing this service is the reliability of the detection of the CAS signal, especially as CAS signals have to be detected while speech is present, i.e. while voice signals are exchanged between the two engaged telephones or similar terminals.

Indeed, speech can cause non detection of really existing CAS signals, but can also generate false detection, i.e. positive detection of non existing CAS signals.

Now, as the considered telephone or terminal has to mute its sending path and its receiving path (modem set into receiving mode) when it assumes to have detected a CAS signal, false detection has of course dramatical effects, by muting the conversation for seconds.

In order to verify the false detection rate of terminals, so-called "talkoff" and "talkdown" testings have been specified (see BELLCORE: GR30 core, ST-TSV-002476 and SE-3004) and, in order to keep false detection rates under bearable threshold values, high demanding criteria have been proposed as to reliability of CAS signal detection when mixed with speech, which are difficult to reach even with sophisticated detection systems.

A "talkoff" error occurs when the office or station has not sent any CAS signal while the telephone or terminal is convinced to have detected a CAS signal in the speech signal produced by the near end or local speaker (user of the local concerned telephone or terminal) or by the distant or far end user (user of the telephone or terminal in communication with the local user).

A "talkdown" error arises when the office or station has actually sent a CAS signal which is then not detected by the concerned telephone or terminal because, when detection is performed, it has been masked, distorted, interfered with or otherwise modified, mainly by the speech signal of the local user.

SUMMARY OF THE INVENTION

It is therefore a main effect of the present invention to propose a simple and low cost solution which allows to decrease significantly, or even to remove completely, all "talkoff" problems generated by far end speech and to greatly simplify the CAS signal detection process. Furthermore, it should be easy to add the proposed solution to any existing CAS detection system, to improve the performances of the latter and to integrate it in any analogue or digital telephones or communication terminals.

Therefore, the present invention concerns a telephone or communication terminal comprising a receiving path and a sending path linked to the communication line, the receiving path being connected to a system able to detect, during a communication, an alert signal or CAS signal sent by the local telephone exchange station or central office upon any new call or connection request for the considered telephone or terminal and allow reception by the latter, for example, of data related to each new caller, by interrupting temporarily the presently existing communication, characterized in that it comprises a detector means able to detect any activity or any signal transmission and/or the absence of the same, in the sending path of the considered telephone or terminal and to deliver a corresponding information signal (IS) to the CAS signal detection system, the latter adjusting its detection method or mode or selecting a corresponding detection subsystem accordingly.

BRIEF DESCRIPTION OF THE DRAWINGS

The present invention will be better understood thanks to the following description and drawing of an embodiment of said invention given as non limitative example thereof, the FIGURE of said drawing consisting of a partial schematic view of a telephone according to the present invention.

DETAILED DESCRIPTION OF THE INVENTION

Figure 1:
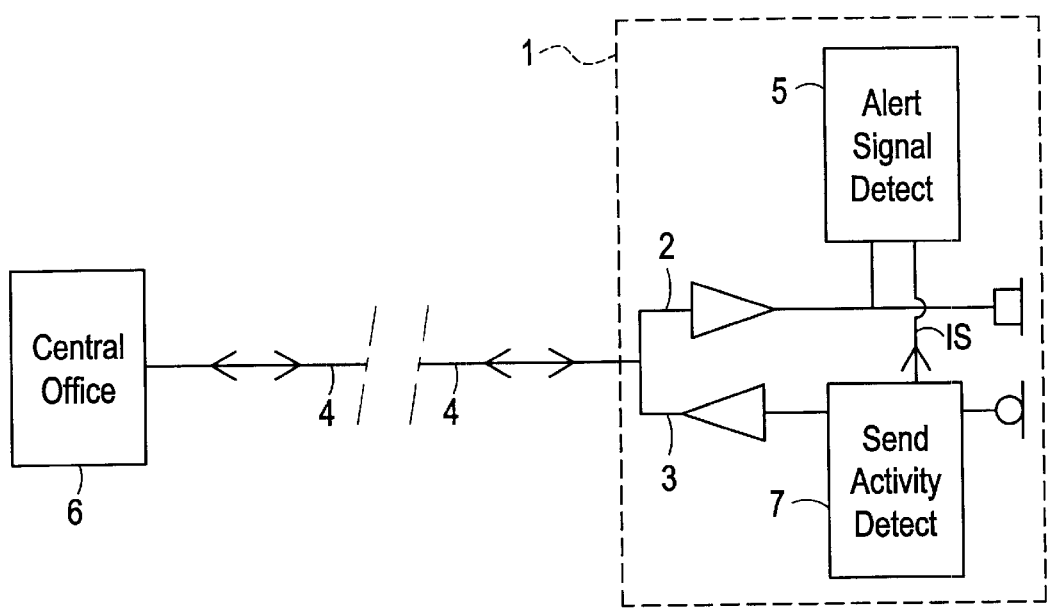

As shown on the enclosed FIGURE, the telephone 1 comprises a receiving path 2 and a sending path 3 linked to the communication line 4, the receiving path 2 being connected to a system 5 able to detect, during an existing communication, a frequency based alert signal or CAS signal sent by the local telephone exchange station or central office 6 upon any new call or connection request for the considered telephone or terminal 1 from another distant caller and to allow reception by said telephone or terminal 1of data related to each new caller, by interrupting temporarily the presently existing communication.

According to the invention, the telephone or communication terminal 1 comprises a detector means 7 able to detect any activity or any signal transmission, and/or the absence of the same, in the sending path 3 of the considered telephone or terminal 1 and to deliver a corresponding information signal (IS) to the CAS signal detection system 5, the latter adjusting its detection method or mode or selecting a corresponding detection subsystem accordingly.

In a first embodiment of the invention, wherein the CAS detection system 5 consists of a software program or two software programs, the CAS detection system 5 applies a disturbed CAS signal detection method or mode when any activity has been detected in the sending path 3 and applies a non disturbed CAS signal recognition method or mode when no activity is detected in the sending path 3.

The selection between the two methods or modes may consist in the election of one among two different CAS detection programs, a sophisticated one for the detection of CAS signals disturbed by speech signals and a basic one for the simple recognition of a non disturbed CAS signal (or at the most only slightly distorted or attenuated by the transmission).

The selection between the two methods or modes may also consists in the setting of two different sets of parameters or criteria for the used CAS detection program, one set enabling the program to detect CAS signals disturbed by speech and the other set simply enabling the recognition of a non disturbed CAS signal.

In a second embodiment of the invention, related to a hardware based CAS detection system 5 or to a CAS detection system 5 composed of two physically separated subsystems (for example two separated circuits or two algorithms supported by two distinct integrated circuits), the said CAS detection system 5 selects a disturbed CAS signal detection subsystem when any activity has been detected in the sending path 3 and selects a non disturbed CAS signal recognition subsystem when no activity is detected in the sending path 3.

According to a possible feature of the invention, the CAS signal detection system may comprise a software or hardware two position switch which is triggered by the activity detector means 7, the latter being or not part of the said CAS signal detection system 5.

The present invention also concerns a method for the detection and identification, by a considered telephone or similar communication terminal 1, of alert signals or CAS signals sent by the telephone exchange station or central office 6 upon any new call or connection request for said telephone or terminal 1 received at said station or office 6, wherein the detection is performed by a detection system 5 analyzing the signals transiting in the receiving path 2 of the considered telephone or terminal 1.

According to the invention, said method consists in:
surveying constantly the sending path 3 for any activity or signal transmission, or the absence of the same, with an adapted detector means 7;
sending a corresponding information signal IS to the CAS signal detection system 5 when a change in the state of the sending path 3, as far as its transmission activity is concerned, is detected;
adjusting the detection method or mode or selecting a corresponding detection subsystem, in accordance with the presence or absence of activity in the sending path 3;
repeating the preceding steps continuously as long as the telephone or communication terminal 1 is in use.

Depending on the nature of the CAS detection system 5 (software or hardware), the adjustment or selection of the detection method or mode to be used, r the selection of a corresponding adapted detection subsystem, may be performed as described before in relation with the two embodiments of the invention.

As explained herein before, the basic idea of the invention consists in adding an activity detector in the sending path 3 of the terminal 1 and in sending the information of presence, and/or absence, of Near End speech to the CAS detection system 5.

When Near End speech is present, a standard CAS detection system (algorithm) is used, as the CAS signal may be very disturbed by the speech signals and has to be correctly filtered.

In the absence of Near End speech, when a real CAS signal has been sent by the station or office 6, it will necessarily arrive as a non disturbed CAS signal at the receiving path 2, as distant user has been muted by the office or the station 6.

IF, in this case, the CAS detection system 5 detects a CAS signal that is disturbed, it is necessarily a "talkoff" problem due to far end speech, and thus cannot be a real CAS signal.

As can be seen from the preceding specification, the invention allows to suppress all "talkoff" problems due to Far End speech when no Near End speech is present, and to use the disturbed CAS detection system only when really necessary. Furthermore, the solution proposed by the invention can be easily associated to or combined with any existing CAS detection system or integrated in any future development of such systems.

The present invention is, of course, not limited to the preferred embodiments described and represented herein, changes can be made or equivalents used without departing from the scope of the invention.

What is claimed is:

1. A communication terminal comprising a receiving path and a sending path linked to a communication line, the receiving path being connected to a signal detection system able to detect, during a communication, an alert signal sent by a station upon any new call or connection request for said terminal and to allow reception of data by said terminal by interrupting temporarily the presently existing communication, said communication terminal comprising a detector able to detect whether or not there is any activity in the sending path of said terminal and to deliver a corresponding information signal to the signal detection system which adjusts its detection method accordingly.

2. A terminal according to claim 1, characterized in that the detection system applies a disturbed signal detection method when any activity has been detected in the sending path and applies a non disturbed signal recognition method when no activity is detected in the sending path.

3. A terminal according to claim 1, characterized in that the detection system selects a disturbed signal detection subsystem when any activity has been detected in the sending path and selects a non disturbed signal recognition subsystem when no activity is detected in the sending path.

4. A terminal according to claim 1, characterized in that the signal detection system comprises a two position switch which is triggered by the activity detector.

5. A terminal according to claim 1, wherein the detector is part of the signal detection system.

6. A method for the detection and identification, by a communication terminal, of alert signals sent by a station upon any new connection request for said terminal received at said station, wherein the detection is performed by a detection system analyzing signals transiting in a receiving path of the terminal, wherein said method comprises:

surveying constantly the sending path with an activity detector;

sending a corresponding information signal to the signal detection system when a change in the state of the sending path is detected by said activity detector;

adjusting the detection method in accordance with the presence or absence of activity in the sending path;

repeating the preceding steps continuously as long as the communication terminal is in use.

7. A method according to claim 6, wherein the signal detection system applies a disturbed signal detection method when any activity has been detected in the sending path and applies a non disturbed signal recognition method when no activity is detected in the sending path.

8. A method according to claim 6, wherein the signal detection system selects a disturbed signal detection subsystem when any activity has been detected in the sending path and selects a non disturbed signal recognition subsystem when no activity is detected in the sending path.

* * * * *